United States Patent [19]

Sager

[11] Patent Number: 5,007,333
[45] Date of Patent: Apr. 16, 1991

[54] AUTOMATIC COFFEE MACHINE

[75] Inventor: Peter Sager, Boppelsen, Switzerland

[73] Assignee: HGZ Maschinenbau AG, Dallikon, Switzerland

[21] Appl. No.: 441,514

[22] Filed: Nov. 27, 1989

[30] Foreign Application Priority Data

Dec. 23, 1988 [DE] Fed. Rep. of Germany ....... 3843568

[51] Int. Cl.$^5$ .............................................. A47J 31/42
[52] U.S. Cl. ..................................... 99/286; 99/289 R
[58] Field of Search ...................... 99/279, 289 R, 287, 99/286, 297, 295, 300, 302 R, 302 P; 426/433

[56] References Cited

U.S. PATENT DOCUMENTS

| 2,827,845 | 3/1958 | Richeson | 99/289 |
| 4,797,296 | 1/1989 | Meier | 99/289 R |
| 4,885,986 | 12/1989 | Grossi | 99/289 R |
| 4,934,258 | 6/1990 | Versini | 99/289 R |

FOREIGN PATENT DOCUMENTS

| 0100030 | 7/1982 | European Pat. Off. . |
| 3615158 | 7/1987 | Fed. Rep. of Germany . |
| 8100107 | 4/1982 | PCT Int'l Appl. . |
| 597812 | 11/1977 | Switzerland . |

*Primary Examiner*—Robert W. Jenkins
*Attorney, Agent, or Firm*—Thomas, Kerr & Kayden

[57] ABSTRACT

An automatic coffee machine, in particular for the preparation of individual cups and small pots, is equipped with an instantaneous water heater (1) for the preparation of hot water, an installation for the feeding of coffee powder and a brewing device incorporating a brewing chamber (17) consisting of a stationary tube section (11) with vertical axis (12) and two locking pieces (15, 16). There is an axial drive (33) for the motion of the upper locking piece (16) in the direction of the axis (12) Of the tube section (11) and a radial drive (31) for the radial motion in relation to this axis (12). The upper locking piece (16) carries the hot-water inlet into the brewing chamber (17), it consists of two parts, i.e. a supporting piece (67) and an at least partly conical centering piece (68). The centering piece (68) is equipped with only one gasket (28) for the sealing of the brewing chamber (17) on the one hand and the sealing of the hot water inlet on the other hand. The centering piece (68) is accommodated on the supporting piece (67) with both limited axial and radial moveability. The gasket (28) is of such a diameter and is designed in accordance with the upper margin (80) of the tube section (11) in such a way that by actuating the axial drive (33) acting on the supporting piece (67), the gasket (28)—after being centered by the centering piece (68)—will rest on the upper margin (80) functioning as stopper and valve rest. The lower locking piece (15) is of piston-like design and may be moved with its gasket (18) by a vertical drive only within the tube section (11).

10 Claims, 3 Drawing Sheets

AUTOMATIC COFFEE MACHINE

BACKGROUND OF THE INVENTION

The invention relates to an automatic coffee machine, in particular for the preparation of individual cups and small pots, with an instantaneous water heater for the preparation of hot water integrated into the housing, with a device for the feeding of coffee powder, with a brewing device having a brewing chamber which consists of a stationary tube section with a vertical axis and two locking pieces, located at least partly in the instantaneous water heater, with at least a part of the tube section of the brewing chamber being surrounded by the hot water of the instantaneous water heater, and with axial drive for the moving of the upper locking piece toward the axis of the tube section and a radial drive for the radial motion in relation to the this axis.

An automatic coffee machine is usually considered as being automatic when the processes of grinding the coffee powder, feeding the coffee powder into the brewing chamber, the brewing process itself and the ejection of the lixiviated coffee powder and the pushing-out of the lixiviated and dry-pressed coffee powder tablet are done automatically, without one of these or other procedural steps having to be carried out or assisted manually. Yet, it is understood that for the effectuation of a cyclic process the automatic coffee machine needs to be actuated by the pressing of a switch, etc. The invention can also be applied to an automatic quantity fresh-brewing device.

A coffee machine of the type described at the outset is known from the U.S. Pat. No. 2,827,845. It has the important advantage that the vertically located brewing chamber formed by a single tube section is already at least partly situated in the housing of the instantaneous water heater so that, regardless of the chronological sequence of the brewing cycles, a largely constant outflow temperature of the coffee beverage will be attained. Hence, the brewing frequency does not influence the outflow temperature. In this case, the brewing device is already equipped with an upper locking piece located in such a way that it can travel both radially and axially in relation to the axis of the brewing chamber tube section. The locking piece itself has conical shape and is equipped with a gasket, having merely the function of sealing the brewing chamber on the top. The capacity for radial traveling can be used to the advantage of having easy access to the brewing chamber at the top for the feeding of coffee powder, and that the coffee grinder can be installed as stationary device above this opening. The brewing chamber also includes a lower locking piece swinging around a horizontal axis, also conical and equipped with a gasket. In the area of the lower locking piece, there is also the hot water inlet into the brewing chamber. In this context, the feeding of hot water does not cause any problems, i.e. neither in the lower ranges of the tube section, nor around the upper locking piece. However, such a brewing chamber with conical locking pieces has the disadvantage that it is impossible to move these conical locking pieces in the tube section in the way of a piston and for example to pre-press the loosely fed coffee powder into a tablet, which would bring about the benefit of a better and more even utilization of the coffee powder. It is also impossible to re-press or dry-press such a tablet after it is lixiviated, and thereby effectuating a dry ejection.

Another automatic coffee machine is known from WO 82/01120. There, the brewing chamber consisting out of a stationary tube section with vertical axis is designed with a carrier plate, linked through a structure of motion links to a second carrier plate. In the second carrier plate, there are hydraulic cylinder/piston-units by means of which two piston-like locking pieces at each end of the tube section may travel into or be moved within the tube section. While the lower locking piece is actuated directly through the pertinent piston/cylinder-unit, the force for the upper locking piece is detoured by way of a yoke-like structure. Both locking pieces are only axially moveable. In addition there is a swivelling funnel piece serving the purpose of feeding the coffee powder from the side into the brewing chamber and the disposing of the lixiviated coffee powder tablet from the brewing chamber. Therefore the coffee grinder is located outside the axis of the brewing chamber so that the funnel piece in its swung-out position may be filled by way of the mill. Regardless of the fact that this construction of the brewing chamber is very costly, another disadvantage is that the upper locking piece with its gasket has to be moved through the swivelling funnel piece, which causes the gasket to travel in and out at the edge of the vertical tube section. This shortens the life of the gasket and thus the perfect functioning of such a coffee machine considerably. Nevertheless, also in this case, the upper locking piece is designed as one part so that in the area of the upper locking piece the feeding of the hot water may be carried out without problems. However, the locking piece cannot be subject to any centering action. Rather, a precise guiding mechanism for the motion links is necessary in order to maintain the function of the gasket at least throughout a relatively short period of time.

CH-PS 597 812 discloses that the upper locking piece of a brewing chamber should be designed in two parts and that the hot water should also be fed into the brewing chamber in the area of this locking piece. There are also meant to be two gaskets of which one gasket is responsible for the sealing of the brewing chamber to the outside, whereas the other gasket seals the hot-water inlet into the brewing chamber. Here, this upper locking piece is traveling radially to the vertical axis of the brewing chamber, while for the purpose of traveling only the gasket that is pressed down inversely, when hot water is let into the brewing chamber, is relieved of the pressure. In the case of radial traveling of the upper locking piece, however, the disengaged gasket rubs over a certain surface in an adverse way, which results in a certain degree of wear.

The EP 100 030 A2 shows a coffee machine with radial powder feed, with the upper locking piece being devised as merely axially traveling in the axis of the tube section of the brewing chamber. Also in this case, gaskets are traveling across edges in an adverse way, which naturally shortens the life of these gaskets. Also DE 36 15 158 C1 shows a coffee machine, where a tube section with vertical axis forms an essential component of the brewing device. It includes an upper locking piece that together with its gasket enters the tube section and travels out of it again. This upper locking piece is devised as one single part and thus permits the feeding of hot water without problems. The lower locking piece is meant to swivel in order to facilitate the downward ejection of the coffee powder. When swung out radially, the surface rubs on the gasket of the lower locking piece, which results in a certain wear. Since this is the case for the lower area of the brewing chamber, the brewed coffee drips out in a downward direction. The entry and the crossing of edges of the tube section also leads to sealing problems in the upper part.

SUMMARY OF THE INVENTION

The object of this invention is to provide an automatic coffee machine of the afore-described kind, preserving all of its advantageous potential from the simple feeding of coffee powder, to the pre-pressing of a tablet out of the coffee powder and the dry ejection of the lixiviated tablet, and to avoid everything that could impair the functioning of the gaskets in the zone of the upper and the lower locking piece with regard to long-term operation. Here, it is particularly important to avoid traveling with gaskets into and out of cylindrical areas. No bores should be overtraveled and the rubbing of gaskets in the radial transport of locking pieces should be avoided.

All of these measures aim at an increase in the life of the gaskets of the brewing chamber and thus at enhancing the required inspection and maintenance intervals for such automatic coffee machines.

With regard to the invention, this is achieved in that the locking piece carries the hot water inlet for the brewing chamber, in that the upper locking piece is designed in two parts and consists of one supporting piece and one at least partly conical centering part which is equipped with only one gasket for the sealing of the brewing chamber on the one hand and for the sealing of the hot water inlet on the other hand, in that the centering piece is accommodated by the supporting piece with both limited axial and radial moveability, in that the gasket is of such a diameter and located in adjustment to the upper margin of the tube section in such a way that when the axial drive acting upon the supporting piece is actuated, the gasket sets itself onto the upper margin as stopper and valve rest after its centering through the centering piece, thus simultaneously sealing the brewing chamber and the hot water inlet, and in that the lower locking piece is of piston-like design and travels with its gasket only within the tube section driven by a vertical drive.

Hence, the upper locking piece is equipped with only one gasket and the lower locking piece, too, is equipped with only one gasket. The gasket located at the upper locking piece never enters the cylindrical area of the tube section of the brewing chamber, but sits only close to the upper margin of the tube section, which in this case acts as stop and valve rest. On the other hand, the gasket of the lower locking piece never travels out of the tube section, but is moved only within the cylindrical area of the tube section, which in this case guarantees a long life. Through the combination of these two possibilities of mounting and designing the gaskets, one gets the additional benefit of the upper locking piece forming a stationary wall in its locked position towards which the lower locking piece may travel into all possible intermediate positions in the way of a piston. In this way, it becomes possible to feed coffee powder from above into the brewing chamber without difficulty, when the upper locking piece is moved away from the upper opening in a radial direction. Since the lower locking piece always remains within the tube section, the bottom of the brewing chamber is closed during the feeding of the coffee powder. Afterwards, the upper locking piece may be moved radially and then axially, until its gasket rests on the margin of the tube section. This gasket fulfils two sealing functions, firstly the sealing of the brewing chamber to the outside and secondly the sealing of the hot-water inlet into the brewing chamber. However, before this happens a tablet may be pre-pressed out of the loosely filled-in coffee powder with the lower locking tapper by means of an appropriate axial motion, representing a more or less stable body of the same thickness so that the distances the hot water must to travel through the tablet will be the same in any spot and an even lixiviating of the coffee powder will take place. This happens at a stage after the pre-pressing of the tablet, when the pressure on the tablet is being somewhat released by the lower locking piece traveling downwards a bit.

The design of this invention permits the use of different amounts of coffee powder, because the lower locking piece may be easily controlled and moved in the way of a piston.

Nevertheless, the detailed design of the upper locking tapper is of particular importance for long life. The hot water is hooked up to its supporting piece by means of a hose. The radial play between centering part and supporting piece is utilized for a self-centering of the centering piece through axial motion, so that the centering piece invariably ends up sitting tightly on the margin of the tube section, regardless of existing difference in temperature and the accuracy in manufacture of the guiding mechanism of the upper locking piece. Since the centering piece also carries the only gasket, the correct position of the gasket in relation to the margin of the tube section is reached simultaneously by way of this self-centering. This, in turn, is a pre-requisite for tight sealing of the brewing chamber to the outside despite the axial moveability of the locking piece. At the same time the fact that the upper locking piece consists of two parts makes it possible to relieve the gasket between supporting piece and centering piece in the detached position, so that the centering piece may effectuate its self-centering with little friction and the gasket will not rub over a surface. This is facilitated by the axial moveability of the centering piece in relation to the supporting piece. Furthermore, the entire upper locking part may travel as a whole so that in the subsequent radial motion, the gasket will also be without contact to any surface of friction.

The design of the lower locking piece with its moveability in the tube section and the radial moveability of the upper locking piece also permit the dry ejection, since the lower locking piece can travel within the tube section so far that the lixiviated tablet is transported out of the tube section at the upper end and that the upper locking piece can be used to push the tablet from the axis to the side through a radial motion. Therefore, the radial drive of the upper locking piece is also multifunctional.

The upper locking piece can be accommodated with its supporting piece on a traveler in a practical way and be moved over the opening of the tube section or away from this opening by means of a radial drive. This facilitates not only the pushing to the side of the a lixiviated tablet of coffee powder, but guarantees at the same time that the installation for the feeding of coffee powder, e.g. a coffee grinder or a powder-proportioning apparatus, may be located exactly above the axis of the tube section of the brewing chamber so that the smooth feeding, by free fall, becomes possible and the parts do not hamper one another.

The axial drive and the radial drive may work independently of each other; the axial drive may be located on the traveler and therefore travel radially. Hence it constitutes an advantage that these two drives may be controlled independently of each other according to the desired function. In this way, it is possible for example to readjust the stroke of the axial drive a bit after positioning the only gasket, in order to restore the initial sealing capacity. On its side facing the centering piece, the supporting piece may have a circumferential groove for the distribution of the hot water, linked to several openings in the centering piece; on its side facing the brewing chamber the centering piece is equipped with a sieve for the transfer of the hot water into the brewing chamber. With this design a regular distribution of the hot water over the cross-section of the brewing chamber, or more precisely, over the coffee-powder tablet is attained. The circumferential groove and the openings are sealed to the outside by means of the sealing function of the only gasket.

The upper margin of the tube section of the brewing chamber may be rounded and the corresponding gasket of the surface may be of conical shape. Thus the upper margin of the tube section forms a clean valve rest, and in the closed position there is more or less a linear contact between gasket and margin. Here, the centering function of the centering piece becomes effective. However, also the opposite design is possible, i.e. to design the margin in conical shape and to round off the gasket.

The axial drive of the upper locking piece may be equipped with a cam, and between the traveler and the supporting piece there may be one or more pillar guides parallel to the axis of the tube section. In this way, it is guaranteed that on the one hand a very simple drive, for example a d.c. motor, may be used for moving the upper locking piece. On the other hand, the pillar guide of the supporting piece prevents a tilting motion under the agency of the corresponding forces by way of the cam. This also guarantees a even pressing-on of the gasket in its locked position between the supporting piece and the centering piece.

The centering piece itself may be equipped with a gasket rest carrying the openings for the hot water transition, accommodated by a stop screw with radial and axial play on the supporting piece and accommodating a sieve. This results in an extremely flat design of the centering piece, composed of practically only the height of the sieve and the height of the gasket so that the lift of the axial motion of the upper locking piece may be kept very small, which in turn contributes positively to a reduced height of the whole automatic coffee machine. Besides, this low height is advantageous in that the stationary installation for the feeding of coffee powder does not need to be located very high above the opening of the tube section.

The vertical drive of the lower locking piece may be equipped with a dual-function hydraulic piston by which the position of the lower locking piece in relation to the stationary upper locking piece may be adjusted in accordance with all the working positions such as feeding of coffee powder, pre-pressing of a tablet out of coffee powder, releasing of pressure, brewing, repressing and ejecting of the tablet. Henceforth, this vertical drive is also used for several functions. Moreover, it is now possible to renounce on an axial entry of the upper locking piece into the tube section.

The tube section forming the brewing chamber may be located in the lower part of the housing of the instantaneous water heater, the outlet for the coffee beverage being connected to the lower locking piece by means of a hose. In this way the tube section and the lower locking piece do not occupy much space and are warmed to the necessary temperature simultaneously with the heating of the water, so as not to influence the outflow temperature of the coffee beverage in a negative way. By means of the interposition of a hose it is nevertheless possible to let the coffee beverage flow out into the cup or the small pot via a stationary tube.

Above the brewing chamber a stationary coffee grinder may be installed as coffee powder feed device. In this case a corresponding feeding funnel is accommodated on a traveler. Naturally, it is also possible to apply several coffee grinders and one or several powder containers, etc. The feeding funnel bridges the distance between the outlet of the coffee grinder and the upper opening of the tube section.

BRIEF DESCRIPTION OF THE DRAWINGS

In the following a preferred embodiment is described, showing.

DETAILED DESCRIPTION

Figure 1:
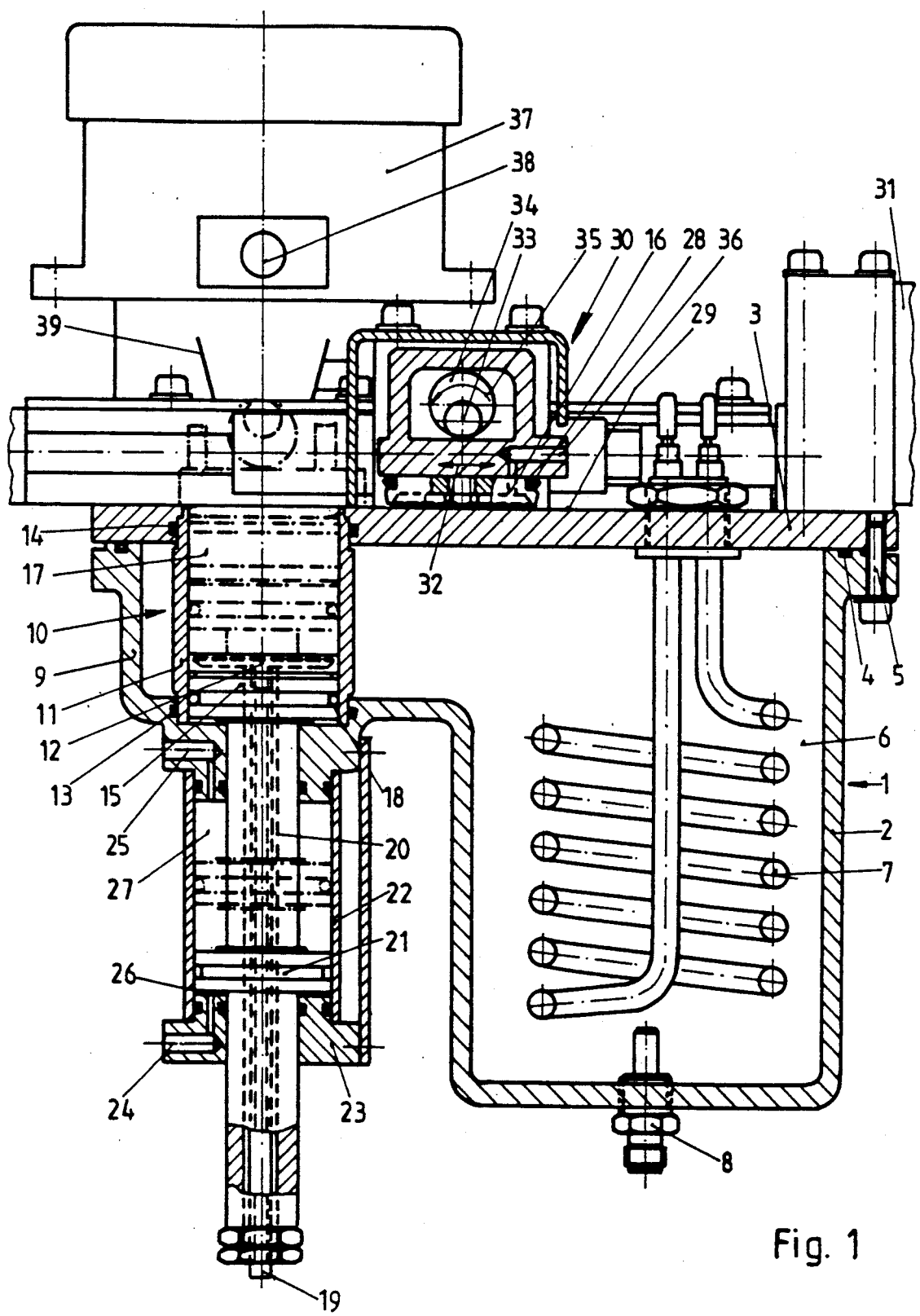
FIG. 1 a vertical section of the most essential components of an automatic coffee machine, FIG. 2 an electric and hydraulic circuit diagram, explaining the connection of the single components, FIG. 3 a section of the automatic coffee machine in the area of the brewing chamber with the tube section and the upper and lower locking pieces.

The automatic coffee machine has an instantaneous water heater 1, whose housing consists of a lower part 2 and a cover part 3, held together by means of a gasket 4 and a number of fastening screws 5. As a consequence an inner chamber 6 is created in the interior of the housing 2,3, in which a heating spiral 7 for the heating of the water in the inner chamber 6 is located. The feeding of cold water is done via a connecting piece 8 located at the lowest spot of the lower part 2.

In a bulge 9 of the housing 2,3 a brewing device 10 is installed. The brewing device 10 has a tube section 11, designed in the form of a cylinder jacket, whose axis 12 is located vertically. The tube section 11 is of a relatively thin-walled design and sealed by means of gaskets 13 and 14, accommodated opposite the inner chamber 6 in the housing 2,3 of the instantaneous water heater 1, while the tube section 11 is accommodated and fixed between the lower part 2 and the cover part 3. Further essential components of the brewing device 10 are a lower piston-like locking piece 15 and an upper locking piece 16. The tube section 11 and the two locking pieces 15 and 16 encompass a brewing chamber 17, where the hot water flows through the coffee powder which is pressed into a tablet and thus produces the coffee beverage. The lower locking piece 15 is equipped with a gasket 18 with which it may be moved in tube section 11 in a locked position. The locking piece 15 has piston-like design and possesses a penetration sieve (83) for the coffee beverage, on whose other side there is a hose 19 transporting the coffee beverage to the outlet of the automatic coffee machine. Connected to the piston-like locking piece 15 is a piston rod 20 to which a hydraulic piston 21 is attached. With this goes a cylinder 22 fastened to the lower part 2 of the instantaneous water heater 1 by means of a cover 23 and the appropriate gaskets. In this place connecting pieces 24 and 25 will form a dual drive through which it will be possible, depending on the amount of hydraulic water fed into the connecting pieces 24 and 25, to move the lower locking piece 15 into any relative position in the direction of the axis 12 and fix it in any position. The locking piece is represented in full lines in its lowest position and in dot-dash lines in a position, where the coffee powder is pre-pressed into a tablet in the brewing chamber 17. Also the corresponding position of the hydraulic piston 21 is represented by dot-dash lines. It can easily be seen that according to the amount of hydraulic water fed through the connecting pieces 24 and 25 into chambers 26 and 27 the lower locking piece 15 may be moved and directed to any given height. Therefore, it is also possible to re-press or dry-press the tablet of lixiviated coffee powder and to lift it above the upper margin of the tube section 11 in order to effectuate a dry ejection.

The upper locking piece 16 is equipped with only one gasket 28 and may be moved axially and radially. For this purpose the top of the cover part 3 of the instantaneous water heater 1 is designed as sliding track 29 on which a traveler 30 may travel radially to the axis 12 of the brewing device 10. For this traveling back and forth, there is a radial drive 31 by means of which the traveler 30 and thus the upper locking piece 16 may be moved according to a double arrow 32 from the parking position represented by full lines into a position above the brewing chamber 17. On the traveler 30 there is an axial drive 33 indicated only by an axis. This axial drive 33 consists of a small electric motor propelling a shaft. Connected to this shaft is a cam 34 so that in the position of the traveler above the brewing chamber 17 a swivelling motion according to arrow 35 leads to an axial motion of the supporting piece 61 of the upper locking piece 16, i.e. in the direction of the axis 12 into the sealing position represented by dot-dash lines. In this case the centering part 68 of the locking piece 16 with its gasket 28 rests on the upper margin of the tube section 11 and seals the brewing chamber 17 at the top. At the same time, the thrust bearing for any compressions is formed by the lower locking piece 15 at the brewing device 10. The upper locking piece 16 is also equipped with a sieve 78 so that hot water may be transported via a connecting piece 36 from the inner chamber 6 of the water heater and through the locking tapper 16 into the brewing chamber 17, where it flows through the tablet out of coffee powder and enters the outlet as coffee beverage via the hose 19.

Above the brewing device 10 there is a coffee grinder 37, whose outlet piece 38 for the ground coffee powder ends approximately in the axis 12 above the brewing chamber 17. Connected to the traveler 30 there is a feeding funnel 39 causing the coffee powder released via the outlet piece after a grinding process of the coffee grinder 37 to fall freely into the brewing chamber 17 and not for example onto the sliding track 29.

Figure 2:
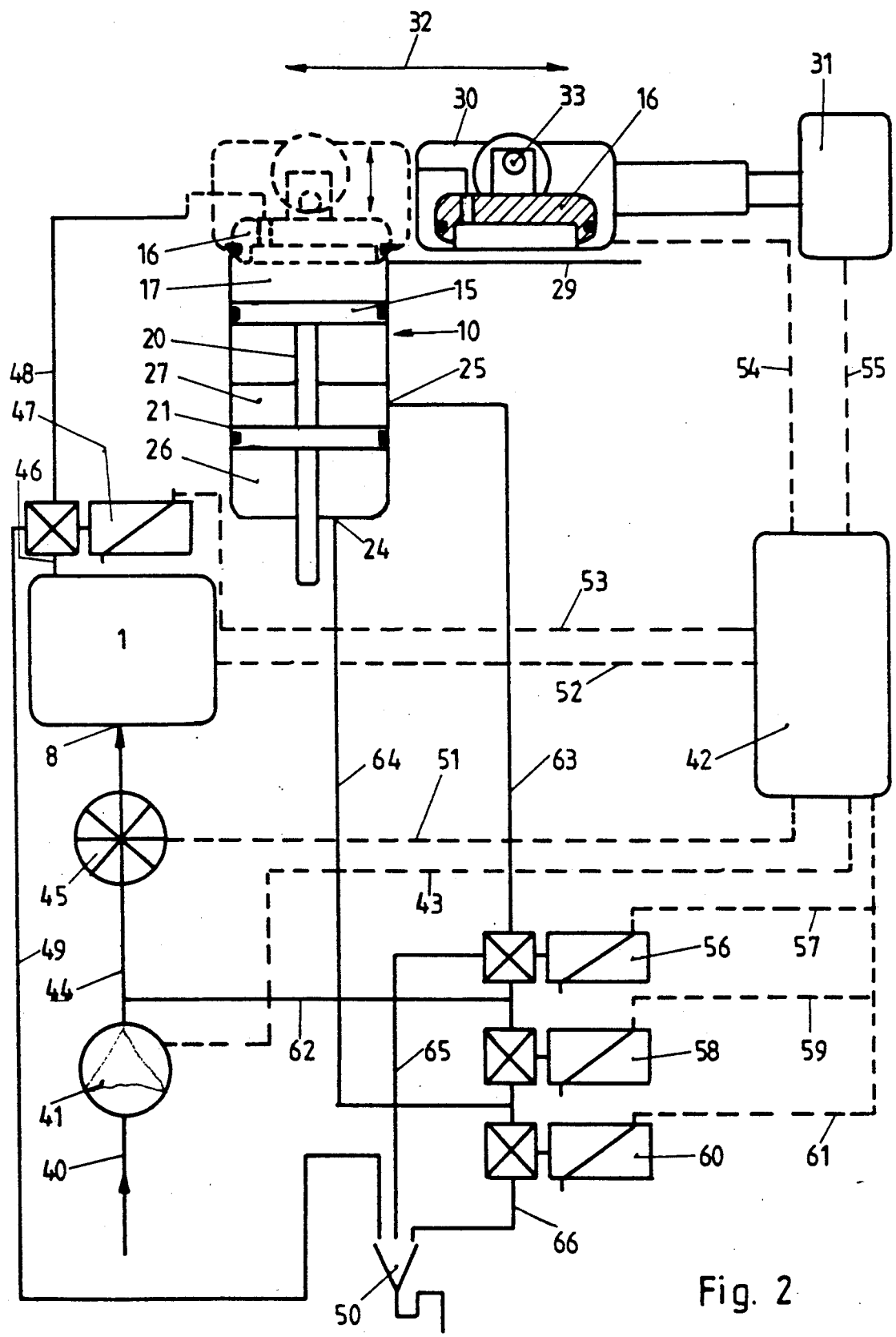

FIG. 2 is a circuit diagram representing the most essential parts of the automatic coffee machine. Here the hydraulic conduits are represented by full lines, whereas the electrical conduits are illustrated by broken lines. A cold water line 40 leads to a pump 41 triggered by an electric conduit 43 via an electronic control device 42. A water line 44 leads from the pump 41 to a water-flowmeter 45 and from there to the connecting piece 8 of the instantaneous water heater 1. From the instantaneous water heater 1 a line 46 for hot water leads to a brewing valve 47 and from there a line 48 through the upper locking piece 16 into the brewing chamber 17. The brewing valve 47 is designed as three/two-way valve, one line 49 leading to one outlet 50. From the electronic control device one electric conduit 51 leads to the water-flowmeter 45, one electric conduit 52 to the heating spiral 7 of the instantaneous water heater 1 and conduits placed in parallel to a temperature control device in the instantaneous water heater 1 which are not represented for reasons of clarity. An electric line 53 controls the brewing valve 47. Another line 54 leads to the axial drive 33, one line 55 to the radial drive 31. Moreover, a hydraulic valve 56 designed as a three/two-way valve may be triggered by a conduit 57. A hydraulic valve 58 is controlled by a conduit 59, and for a hydraulic valve 60 a conduit is installed 61. The hydraulic valves 58 and 60 are designed as two/two-way valves. From the water line 44 a hydraulic line 62 branches off to which the two hydraulic valves 56 and 58 are connected. From the hydraulic valve 56 a line 63 leads to the connecting piece 25 and thus to the chamber 27 of the hydraulic piston 21, while a line 64 leads in likewise manner to the connecting piece 24 and to the chamber 26. From the hydraulic valve 56 a line 65 and from the hydraulic valve 60 a line 66 lead to the outlet 50.

Figure 3:
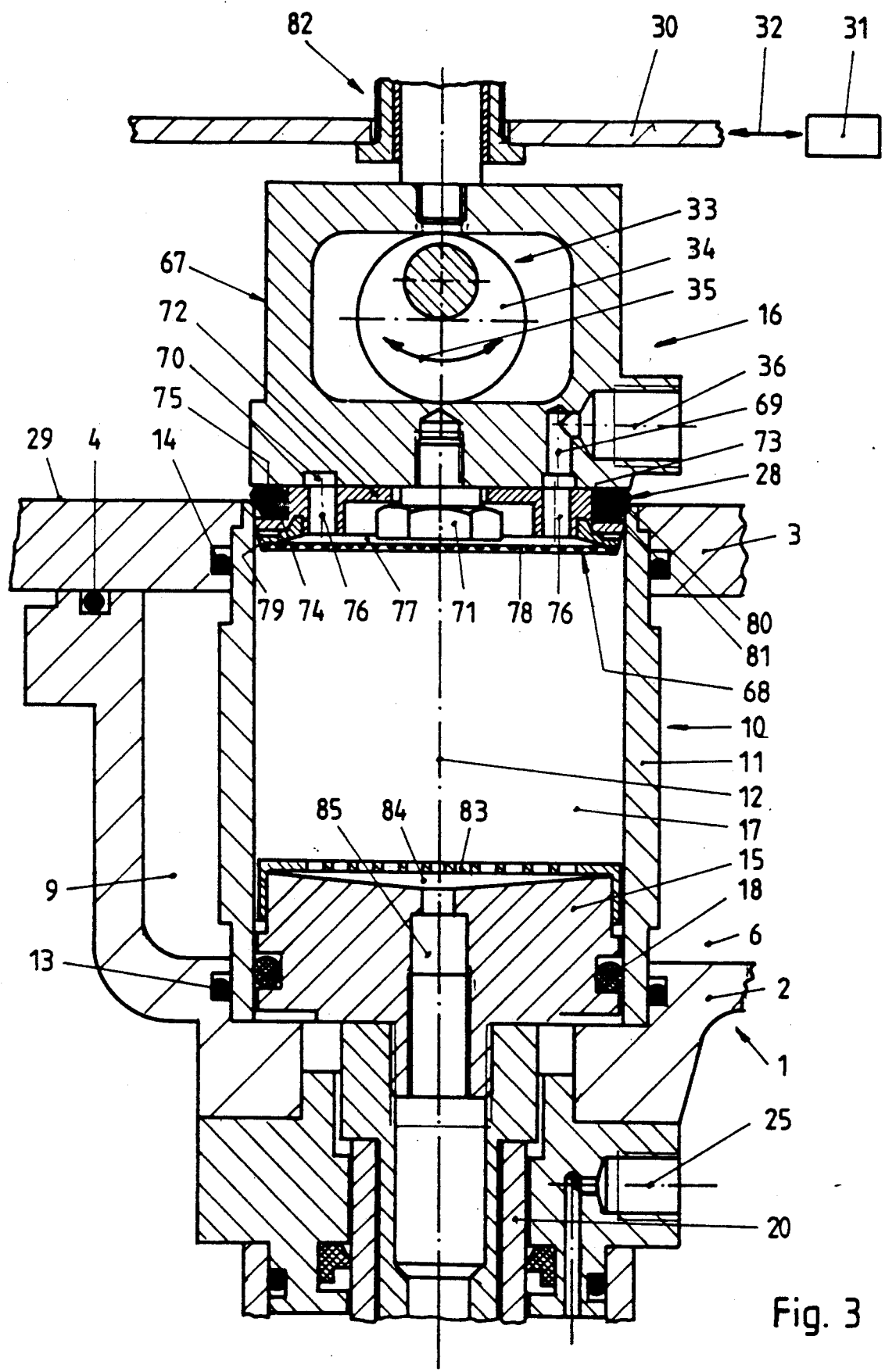

FIG. 3 represents a segment of the automatic coffee machine as portrayed in FIG. 1 in order to clarify the precise construction of the brewing device 10 together with its most essential parts. The tube section 11 is, as can already be seen in FIG. 1, held in a locked position between the lower part 2 and the cover part 3 of the instantaneous water heater 1 by means of the gaskets 13 and 14 so that the tube section 11 is accommodated in the bulge 9 of the instantaneous water heater 1 and thus on all sides surrounded by hot water. The tube section 11 is located with its axis 12 in a vertical direction. The cover part 3 ends on top in a sliding track 29 on which the traveler 30 may be moved with the help of the linear drive 31 (in this place only diagrammatically represented) in the direction of the double arrow 32 radially to the axis 12, i.e. between two positions: the parking position in FIG. 1 and the sealing position in FIG. 3. Naturally enough, the sealing position can only be attained when, embarking from the parking position, the radial drive 31 effectuates its lift so that the upper locking piece 16 will not touch the sliding track 29. When the position of the traveler 30 in the axis 12 is reached, the axial drive 33 located as traveling on the traveler is actuated, which causes the cam 34 to swing according to arrow 35 into the position described in FIG. 3, so that the entire upper locking piece 16 effectuates a vertical motion in the axis 12.

The upper locking piece 16 consists of two parts. It has a supporting piece 67 and a centering piece 68. Attached to the supporting piece 67 is the connecting piece 36 for the hot water that needs to be fed into the brewing chamber 17. A bore ends in an annular, circumferential groove 70 located on the side facing the centering piece 68, which serves the purpose of distributing the hot water over the entire cross-section.

The side of the centering piece 68 facing downwards, i.e. facing the brewing chamber 17 is cone-shaped and accommodated opposite the supporting piece 67 by a stop screw 71 with limited radial and axial play, so that upon entry into the tube section 11 it may effectuate a self-centering to the axis 12, due to the vertical motion of the axial drive 33 and independently of the supporting piece 67. The centering piece 68 is equipped with a gasket rest 72, fastened by the stop screw 71 in a position facing the supporting piece 67. This gasket rest 72 carries a circumferential groove 73 and in it the only gasket 28 of the upper locking piece 16. The groove 73 has a surface 74 facing a contact face 75 of the supporting piece 67. The intended axial play between the gasket rest 72 of the centering piece 68 and the supporting piece 67 is dimensioned in such a way that in the transport position and during the self-centering the surface 74 and the contact face 75 become disengaged from the gasket 28. It is only in the locked position as portrayed in FIG. 3 that the surfaces 74 and 75 become engaged to the gasket 28 so that the hot water fed during the brewing stage by way of the connecting piece 36 is sealed off to the outside. The gasket rest 72 is equipped with openings 76 connected to the circumferential groove 70 in the supporting piece 67 and leading to a hollow space 77 covered by the sieve 78. This sieve 78 possesses on its circumference a conical surface 79 which in connection with the upper margin 80 of the tube section 11 causes the self-centering. The sieve 78 is supported on the gasket rest 72 by means of a press fit.

The gasket 28 fulfils another sealing function. It possesses a conical surface 81 whose smallest diameter is smaller than the inside diameter of the tube section 11 and whose largest diameter is larger than its inside diameter. The upper margin 80 of the tube section 11 is rounded so that as valve seat it acts together with the conical surface 81 and seals the brewing chamber 17 at the top.

It can be noted that in the course of the axial motion caused by the axial drive 33 the centering piece 68 moves downward together with the supporting piece 67 for the closing of the brewing chamber 17, the surfaces 74 and 75 not being in contact. At this point a self-centering takes place, where the conical surface 79 is led through the margin 80 and fits itself precisely centrical into the tube section 11. In the case of further downward motion the conical surface 81 is set onto the upper margin 80 of the tube section 11, the margin 80 forming a virtual valve rest and a stop for the downward motion of the centering piece 68. When moving down further, also the axial play disappears and the surface 75 as well as the surface 74 become engaged to the gasket 28, so that the locking position is attained. In order to prevent a tilting motion of the supporting piece 67 when moving downwards and thus a jamming within the contact face 75, one or more pillar guides 82 are positioned between the traveler 30 and the supporting piece 67 so that the supporting piece 67 will effectuate a precise vertical motion when the axial drive 33 is actuated, that is parallel to the axis 12. One notes that the gasket 28 does not travel into the bore/bore hole of the tube section 11, but rests merely on the margin 80. This is a usual valve function putting the material of the gasket 28 under far less strain than the overtraveling of a sharp edge of the entry into a bore.

The lower locking piece 15 is accommodated in the fashion of a piston, with its gasket 18 in the area of the inside diameter of the tube section 11 and is moved invariably in a vertical direction and within the tube section 11. Linked to the lower locking piece 15 is also a sieve 83 followed by a hollow space 84 passing into a bore/bore hole 85 which leads to the hose 19 (FIG. 1) through which the coffee beverage flows to the outlet.

After the analysis of FIGS. 1–3 the function of the automatic coffee machine is to be explained as follows:

At the daily start of the automatic coffee machine, e.g. at the beginning of breakfast time or such, the control device 42 is put into operation. The brewing water is heated by means of the heating spiral 7, simultaneously heating the brewing device 10 together with its most essential parts. The lower locking piece 15 is in the position represented in FIG. 1 in full lines, and is therefore also heated, the entire circumference of the tube section 11 being surrounded by water that is being heated. Together with the heating of the water, also the lower part 2 and the cover part 3 of the housing of the instantaneous water heater 1 are heated, so that also the upper locking piece 16 located at the traveler 30 gets warmed up. As soon as the temperature control device in the inner chamber 6 of the instantaneous water heater 1 shows that the water has reached the required temperature, also the other parts of the brewing device 10 already show the required temperature and the automatic coffee machine is ready for working. By another actuating process, effectuated mechanically at the control device 42, the first cup or small pot of coffee may be prepared. For this purpose the traveler 30, and together with it the upper locking tapper 16, remains in (or it travels into) the position represented in FIG. 1 in full lines so that the feeding funnel 39 is located between the outlet parts 38 of the coffee grinder 37 and the brewing chamber 17 open at the top. The coffee grinder not represented in FIG. 2 is also actuated via the control device 42 for the respective time unit (cup or small pot) so that the necessary dose of coffee powder will fall down into the brewing chamber 17 of the brewing device 10. As soon as the grinding process ends, the control device 42 triggers the radial drive 31 so that the traveler 30 with the upper locking piece 16 is moved to the left according to the double arrow 32 in FIG. 2, until the axis of the locking piece 16 is in the axis 12 of the brewing device 10. In this position the radial drive 31 is stopped and the axial drive is triggered so that the centering piece 68 of the upper locking piece 16 centers itself on the margin 80 and on the inside diameter of the tube section 11. In the case of a further joint downwards movement of the centering part 68 and the supporting piece 67 in the direction of the axis, the gasket 28 also centered to the axis 12 by the centering piece 68, comes to rest with its conical surface 81 on the upper margin 80 of the tube section 11, the margin 80 acting as stopper. When the supporting piece 67 moves even further down towards the centering piece 68 also the axial play between the surface 74 and the contact face 75 disappears so that now the two sealing gaps are closed more or less simultaneously and are thus sealing both brewing chamber 17 and the hot water to the outside by means of the only gasket 28. The pressure applied through the axial drive 33 is distributed over the two locked sealing gaps and the position illustrated in FIG. 3 is reached. Now, the locking piece 16 with the supporting piece 67 and the centering piece 68 remains in its place for some time. By triggering the hydraulic valve 58, cold water flows into the chamber 26 and thus lifts not only the hydraulic piston 41, but also the lower locking piece 15 so that the loosely filled-in coffee powder is compressed into a tablet. By way of this motion, water is passed through the opened hydraulic valve 56, out of the chamber 27 and out through the lines 63 and 65. As soon as the pre-pressing of the tablet out of coffee powder is done, the hydraulic valves 56 and 58 are reversed for a short period of time so that pressure on the tablet is relieved and both hydraulic piston 21 and the lower locking piece 15 are brought to rest in the position represented in FIG. 1 with dot-dash lines. In this position the actual brewing process may begin. Now, the pump 41 is triggered via the conduit 43 and also the brewing valve 47 is triggered via the conduit 53. With the waterflowmeter 45 an amount of fresh water corresponding to the desired amount of coffee beverage is fed into the inner chamber 6 of the instantaneous water heater and the necessary amount of hot water is transported via the line 48 through the upper locking tapper 16 and distributed over the sieve 78 into the brewing chamber 17, where it flows through the tablet of coffee powder and gets as coffee beverage to the outlet via the hose 19. Near the end of the hot water transition through the brewing chamber 17, the brewing valve 47 is closed again, while the triggering of the hydraulic valve 58 causes a re-pressing and dry-pressing of the coffee-powder tablet. This ends the delivery of the coffee beverage. After the necessary releasing of the lower locking piece 15, the upper locking piece 16 is opened and swung out by subsequently actuating the axial drive 33 and the radial drive 31 by means of the control device 42. As soon as the upper margin 80 of the tube section 11 lies free, the hydraulic valve 58 may be triggered in order to lift the tablet of lixiviated coffee powder to a point, where the cross edge of the lower locking piece 15 lies flush with the upper edge of the cover part 3, or where it lies in the sliding track 29. By actuating the radial drive 31 and with the help of the traveler 30, the dry coffee-powder tablet is transported out to the side on the sliding track 29 being pushed by the traveler 30. Afterwards, the hydraulic valves 56 and 60 are triggered in order to send cold water over the line 63 into the chamber 27, the lower locking piece 15 traveling downwards again. The water in chamber 26 is transported through the conduits 64 and 66 to the outlet 50. Then, a new brewing process may ensue.

It must be noted that the control device 42 and the various hydraulic valves 47, 56, 58 and 60 and the other details of the device permit the triggering of various intermediate steps and the effectuating of further measures with one and the same device. It can thus be imagined that the amount of coffee powder needed for a small pot of coffee beverage must be greater than the amount of coffee powder used for a cup of coffee beverage put into effect by the appropriate time-control of the coffee grinder 37 and also by means of the appropriate moving away of the lower locking part 15 in relation to the upper locking part 16. In this case a somewhat smaller amount of coffee powder can be used for a small pot of coffee than would normally correspond to the double amount of coffee powder for a cup without reducing the quality of the coffee beverage.

While a preferred embodiment of the invention has been disclosed herein, it will be obvious to those skilled in the art that variations and modifications can be made without departing from the spirit and scope of the invention as set forth in the following claims.

I claim:

1. An automatic coffee machine, in particular for the preparation of individual cups and small pots, comprising a housing, an instantaneous water heater for the preparation of hot water in said housing, a brewing chamber comprising a stationary tube section having a vertical axis and upper and lower ends and upper and lower locking pieces with at least a portion of said tube section being located within said housing and adapted to be surrounded by hot water, feeding means for feeding coffee powder into said brewing chamber, radial drive means for moving said upper locking piece toward and away from the vertical axis of said tube section and axial drive means for moving said upper locking piece along the vertical axis of said tube section toward and away from said upper end of said tube section, said upper locking piece having inlet means for introducing hot water into said brewing chamber and comprising a support piece and a partially conically shaped centering piece mounted on said support piece and adapted for limited radial and axial movement with respect thereto and having a single gasket for sealing said brewing chamber and said inlet means, said gasket having a diameter sufficient to seal said brewing chamber at the upper end of said tube when said centering piece is centered over said upper end, and said lower locking piece being adapted to function as a piston within said tube section and having a gasket adapted to bear against the walls of said tube, means for maintaining said lower locking piece within said tube section, and vertical drive means for driving said lower locking piece for movement solely within said tube section.

2. An automatic coffee machine as claimed in claim 1 wherein said support piece and said centering piece are mounted on a traveler adapted to be moved radially to a position over said upper end of said tube section and to a position remote therefrom by said radial drive means.

3. An automatic coffee machine as claimed in claim 2 wherein said axial drive means is mounted on said traveler.

4. An automatic coffee machine as claimed in claim 2 wherein said axial drive means comprises a cam adapted to bear against said support piece and at least one pillar guide means is located between said traveler and said support piece and oriented parallel to said vertical axis.

5. An automatic coffee machine as claimed in claim 2 wherein said feeding means comprises a stationary coffee grinder mounted above said brewing chamber and a funnelling device mounted on said traveler.

6. An automatic coffee machine as claimed in claim 1 wherein said support piece has a circumferential groove therein adjacent said centering piece for distributing hot water, said centering piece having a plurality of openings adjacent said support piece for distributing hot water and a sieve member adapted to introduce hot water into said brewing chamber.

7. An automatic coffee machine as claimed in claim 1 wherein said upper end of said tube section has a conically shaped surface adapted to mate with the conically shaped centering piece.

8. An automatic coffee machine as claimed in claim 1 wherein said centering piece has a gasket rest and is mounted on said support piece by means of a stop screw having radial and axial play.

9. An automatic coffee machine as claimed in claim 1 wherein said vertical drive means comprises a double action hydraulic piston.

10. An automatic coffee machine as claimed in claim 9 wherein said tube section is located in an upper portion of said housing and a coffee outlet is connected to said lower locking piece by means of a hose.

* * * * *